(12) United States Patent
Cho (10) Patent No.: US 9,743,455 B2
(45) Date of Patent: *Aug. 22, 2017

(54) APPARATUS AND METHOD FOR FILTERING IP PACKET IN MOBILE COMMUNICATION TERMINAL

(71) Applicant: Samsung Electronics Co., Ltd., Suwon-si, Gyeonggi-do (KR)

(72) Inventor: Sie-Joon Cho, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 64 days.

This patent is subject to a terminal disclaimer.

(21) Appl. No.: 14/717,279

(22) Filed: May 20, 2015

(65) Prior Publication Data
US 2015/0257194 A1  Sep. 10, 2015

Related U.S. Application Data

(63) Continuation of application No. 14/071,046, filed on Nov. 4, 2013, now Pat. No. 9,049,721, which is a
(Continued)

(30) Foreign Application Priority Data

Apr. 7, 2010  (KR) .................. 10-2010-0031702

(51) Int. Cl.
| | | |
|---|---|---|
| *H04W 4/00* | (2009.01) | |
| *H04W 76/02* | (2009.01) | |
| *H04L 12/26* | (2006.01) | |
| *H04L 29/06* | (2006.01) | |
| *H04W 76/04* | (2009.01) | |
| *H04W 76/06* | (2009.01) | |
| *H04W 80/04* | (2009.01) | |

(Continued)

(52) U.S. Cl.
CPC ......... *H04W 76/027* (2013.01); *H04L 43/028* (2013.01); *H04L 43/18* (2013.01); *H04L 63/0236* (2013.01); *H04W 76/046* (2013.01); *H04W 76/064* (2013.01); *H04L 63/126* (2013.01); *H04W 12/10* (2013.01); *H04W 80/04* (2013.01); *H04W 88/02* (2013.01)

(58) Field of Classification Search
CPC ............. H04W 76/027; H04W 76/046; H04W 76/064; H04W 80/04; H04W 88/02; H04W 12/10; H04L 43/028; H04L 43/18; H04L 63/0236
See application file for complete search history.

(56) References Cited

U.S. PATENT DOCUMENTS

| | | |
|---|---|---|
| 5,590,403 A | 12/1996 | Cameron et al. |
| 5,603,081 A * | 2/1997 | Raith .................. H04B 7/2643 370/337 |

(Continued)

*Primary Examiner* — Kevin Mew
(74) *Attorney, Agent, or Firm* — Jefferson IP Law, LLP (57) ABSTRACT

An apparatus and method are provided. The method includes receiving, at an electronic device including a first processor and a second processor, using the first processor, a connection request via a network, and refraining from transmitting the connection request from the first processor to the second processor based at least in part on a determination that the second processor is in a sleep state, and that the connection request is associated with data set as unallowable by the second processor.

20 Claims, 5 Drawing Sheets

Related U.S. Application Data continuation of application No. 13/081,813, filed on Apr. 7, 2011, now Pat. No. 8,588,067.

(51) Int. Cl.
*H04W 88/02* (2009.01)
*H04W 12/10* (2009.01)

(56) References Cited

U.S. PATENT DOCUMENTS

| | | | |
|---|---|---|---|
| 6,731,627 B1 | 5/2004 | Gupta et al. | |
| 6,760,324 B1 | 7/2004 | Scott et al. | |
| 6,950,408 B1 | 9/2005 | Domon et al. | |
| 6,951,521 B2 | 10/2005 | Hakui | |
| 7,068,656 B2 | 6/2006 | Sainomoto et al. | |
| 7,490,162 B1 | 2/2009 | Masters | |
| 8,305,924 B2 | 11/2012 | Dwyer et al. | |
| 8,494,144 B2 * | 7/2013 | Hodge | H04M 3/2281 379/142.01 |
| 8,588,067 B2 | 11/2013 | Cho | |
| 2002/0009079 A1 | 1/2002 | Jungck et al. | |
| 2002/0055980 A1 * | 5/2002 | Goddard | H04L 29/06 709/217 |
| 2002/0118640 A1 * | 8/2002 | Oberman | H04L 49/25 370/230 |
| 2002/0196782 A1 | 12/2002 | Furukawa et al. | |
| 2003/0081592 A1 | 5/2003 | Krishnarajah et al. | |
| 2004/0268149 A1 * | 12/2004 | Aaron | H04L 63/02 726/11 |
| 2005/0010668 A1 | 1/2005 | Chen | |
| 2006/0029104 A1 | 2/2006 | Jungck | |
| 2006/0293048 A1 * | 12/2006 | Swanson | G06Q 30/02 455/426.1 |
| 2007/0044155 A1 | 2/2007 | Pletka et al. | |
| 2007/0078986 A1 * | 4/2007 | Ethier | H04L 65/1069 709/227 |
| 2007/0083924 A1 * | 4/2007 | Lu | H04L 63/0227 726/13 |
| 2007/0183392 A1 | 8/2007 | Tandai et al. | |
| 2007/0211738 A1 | 9/2007 | Guo | |
| 2008/0159264 A1 | 7/2008 | Fleming | |
| 2008/0267214 A1 | 10/2008 | Jaakkola | |
| 2009/0213792 A1 | 8/2009 | Lee | |
| 2009/0222578 A1 * | 9/2009 | Schneider | H04L 63/029 709/238 |
| 2009/0270099 A1 | 10/2009 | Gallagher et al. | |
| 2010/0215133 A1 | 8/2010 | Stebbings et al. | |
| 2012/0167221 A1 * | 6/2012 | Kang | H04L 63/0236 726/24 |
| 2013/0031605 A1 * | 1/2013 | Huston, III | H04L 67/02 726/3 |
| 2013/0242754 A1 * | 9/2013 | Shaikh | H04W 24/04 370/242 |

\* cited by examiner

APPARATUS AND METHOD FOR
FILTERING IP PACKET IN MOBILE
COMMUNICATION TERMINAL

PRIORITY

This application is a continuation of prior U.S. patent application Ser. No. 14/071,046, filed on Nov. 4, 2013, which issued as U.S. Pat. No. 9,049,721 on Jun. 2, 2015; which is a continuation of U.S. patent application Ser. No. 13/081,813, filed on Apr. 7, 2011, which issued as U.S. Pat. No. 8,588,067 on Nov. 19, 2013; which claims the benefit under 35 U.S.C. §119(a) of a Korean patent application filed in the Korean Intellectual Property Office on Apr. 7, 2010, and assigned Serial No. 10-2010-0031702, the entire disclosure of each of which is hereby incorporated by reference.

BACKGROUND OF THE INVENTION

1. Field of the Invention

The present invention relates to an apparatus and a method for filtering an Internet Protocol (IP) packet in a mobile communication terminal. More particularly, the present invention relates to an apparatus and a method for reducing unnecessary current consumption through IP packet filtering in an always-on mobile communication terminal including two Central Processing Units (CPUs).

2. Description of the Related Art

Recently, the number of mobile apparatuses using a high performance open Operating System (OS) including two CPUs is increasing. Such mobile apparatuses are characterized by always-on operation that maintains an open data session in order to support functions such as a Voice over Internet Protocol (VoIP), a mobile messenger, a push mail, etc.

A terminal using a Wideband Code Division Multiple Access (WCDMA) system is allocated an IP address from a service provider network. In most cases, the allocated IP address is a public IP. An always-on terminal that has been allocated a public IP is exposed to an undesired Transmission Control Protocol (TCP) connection request from an external network. The terminal is connected to a radio channel due to introduced IP packets at this point, and causes current consumption. In addition, for push mail, a push mail application releases a radio channel after packet transmission ends, but when a radio channel is connected due to IP packets introduced by the undesired TCP connection request, an entity that releases the radio channel does not exist and so additional current consumption occurs until a network timer ends.

An IP packet introduction scenario of an always-on terminal including two CPUs according to the conventional art is described below. After a Packet Data Protocol (PDP) context is generated, a terminal and a mobile network enter a Radio Resource Control (RRC) idle state. In this RRC idle state, when an IP packet for a TCP connection request is introduced to the mobile network from an external server, the mobile network transmits a Packet Switched (PS) paging message to the terminal. Accordingly, the terminal and the mobile network transition to an RRC connected state. In this RRC connected state, the mobile network transmits an IP packet introduced from the external server to the terminal, and a modem of the terminal transfers an IP packet received from the mobile network to an application CPU of the terminal. A TCP stack of the application CPU side of the terminal determines that the relevant IP packet is an IP packet for an undesired TCP connection request and transmits an IP packet for TCP reset to the external server via the mobile network, thereby rejecting a TCP connection request from the external server. The terminal and the mobile network maintain RRC connection state for one minute generally until a timer of the mobile network ends.

As described above, since a TCP stack exists at an application CPU side in an always-on terminal including two CPUs, an IP packet introduced from an external server is transferred to the application CPU without filtering, and an RRC connection is not immediately released even after TCP connection request rejection and maintained until the RRC connection is ended by a mobile network, and so current consumption occurs continuously.

SUMMARY OF THE INVENTION

Aspects of the present invention are to address at least the above-mentioned problems and/or disadvantages and to provide at least the advantages described below. Accordingly, an aspect of the present invention is to provide an apparatus and a method for filtering an Internet Protocol (IP) packet in a mobile communication terminal.

Another aspect of the present invention is to provide an apparatus and a method for reducing unnecessary current consumption through IP packet filtering in an always-on mobile communication terminal including two Central Processing Units (CPUs).

Another aspect of the present invention is to provide an apparatus and a method for preventing occurrence of continuous current consumption by allowing a modem of a terminal to filter a relevant IP packet when an undesired IP packet is introduced from an external server, and immediately instructing a mobile network to release a Radio Resource Control (RRC) connection in an always-on mobile communication terminal including two CPUs.

Another aspect of the present invention is to provide an apparatus and a method for allowing a modem to manage an allowable/unallowable Transmission Control Protocol/User Datagram Protocol (TCP/UDP) port using a white/black list and filtering an IP packet introduced from an external server using the white/black list in an always-on mobile communication terminal including two CPUs.

In accordance with an aspect of the present invention, a method is provided. The method includes receiving, at an electronic device including a first processor and a second processor, using the first processor, a connection request via a network, and refraining from transmitting the connection request from the first processor to the second processor based at least in part on a determination that the second processor is in a sleep state, and that the connection request is associated with data set as unallowable by the second processor.

In accordance with another aspect of the present invention, an apparatus is provided. The apparatus includes a first processor to execute an application, and a second processor to control a communicative connection between the apparatus and a network. The second processor is configured to receive a connection request via the network, and refrain from transmitting the connection request to the first processor based at least in part on a determination that the connection request is associated with data set as unallowable by the first processor.

In accordance with yet another aspect of the present invention, a non-transitory machine-readable storage device storing instructions is provided. The instructions, when executed by one or more processors, cause the one or more processors to perform operations including receiving, at an electronic device including a first processor and a second processor, using the first processor, a connection request via a network, and refraining from transmitting the connection request from the first processor to the second processor based at least in part on a determination that the second processor is in a sleep state, and that the connection request is associated with data set as unallowable by the second processor.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding, but these are to be regarded as merely exemplary. Accordingly, those of ordinary skill in the art will recognize that various changes and modifications of the embodiments described herein may be made without departing from the scope and spirit of the invention. Also, descriptions of well-known functions and constructions are omitted for clarity and conciseness.

The terms and words used in the following description and claims are not limited to the bibliographical meanings, but are merely used by the inventor to enable a clear and consistent understanding of the invention. Accordingly, it should be apparent to those skilled in the art that the following description of exemplary embodiments of the present invention are provided for illustration purposes only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Exemplary embodiments of the present invention provide an alternative for filtering an Internet Protocol (IP) packet in a mobile communication terminal. In the following description, though an always-on Wireless Code Division Multiple Access (WCDMA) mobile communication terminal including two Central Processing Units (CPUs) is described, exemplary embodiments of the present invention are applicable to all always-on mobile communication terminals where a Transmission Control Protocol (TCP) stack exists on an application CPU side.

Figure 1:
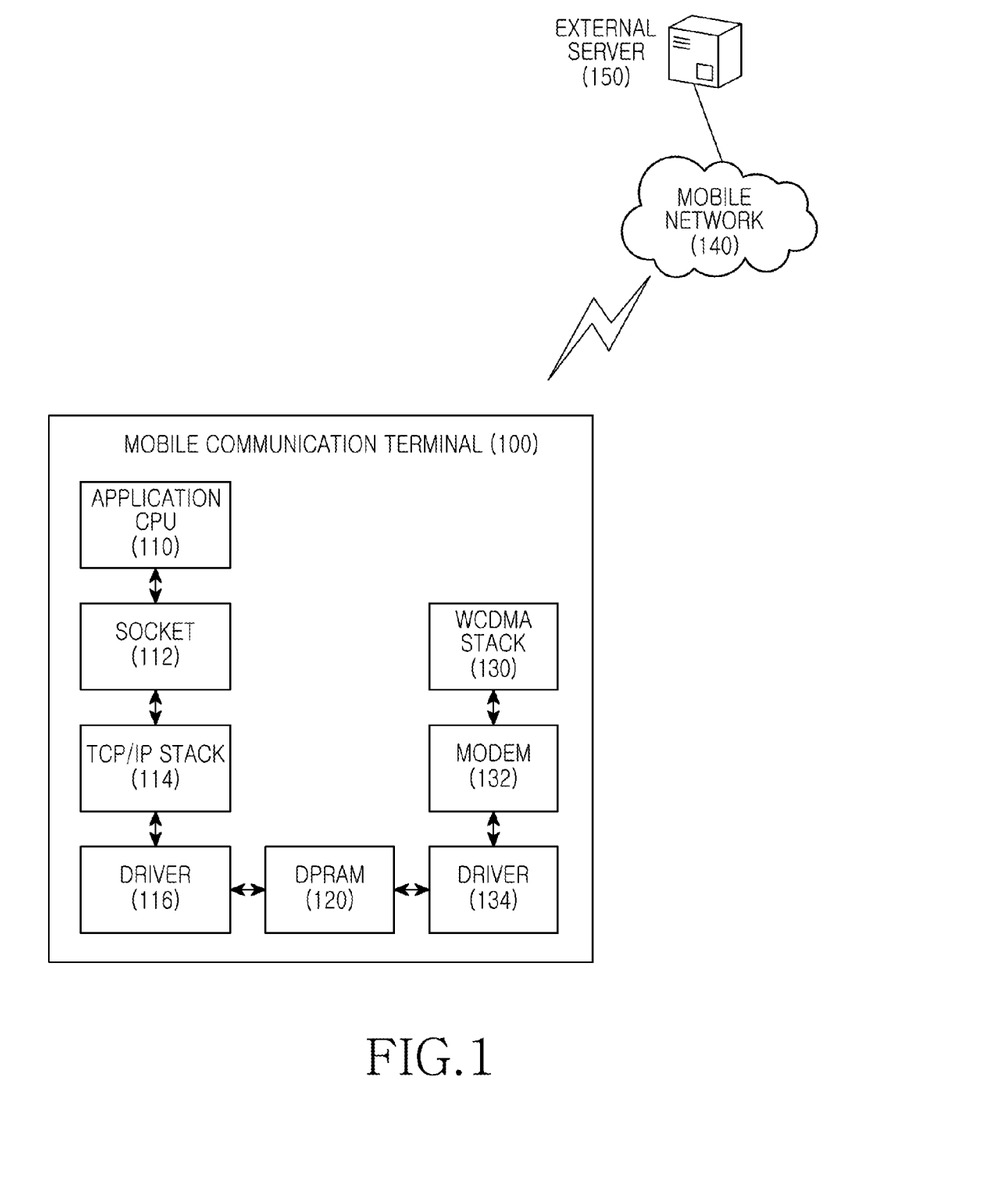
FIG. 1 is a block diagram illustrating a structure of a mobile communication system and an apparatus of a mobile communication terminal according to an exemplary embodiment of the present invention.

FIG. 1 is a block diagram illustrating a structure of a mobile communication system and an apparatus of a mobile communication terminal according to an exemplary embodiment of the present invention.

As illustrated, the mobile communication terminal 100 includes an application CPU 110, a socket 112, a TCP/IP stack 114, a driver 116, a Dual-Ported Random Access Memory (DPRAM) 120, a WCDMA stack 130, a modem 132, and a driver 134. The mobile communication terminal 100 may include additional units. Similarly, the functionality of two or more of the above units may be integrated into a single component. Some of the components of the mobile communication terminal may be implemented in software or as a combination of hardware and software elements, while other components would be understood as implemented as hardware components. For example, the application CPU may include a hardware microprocessor that executes an application. Similarly, the modem 132 would be understood as including hardware to generate and receive signals corresponding to packets, and software for interpreting and manipulating those signals.

Referring to FIG. 1, the WCDMA stack 130 provides a WCDMA packet introduced from a mobile network 140 to the modem 132, and transmits a WCDMA packet from the modem 132 to the mobile network 140.

The modem 132 filters an IP packet that needs to be transferred to the application CPU 110 from WCDMA packets provided from the WCDMA stack 130, and provides the filtered IP packet to the driver 134. When receiving an IP packet unallowable by the application CPU 110 from the mobile network 140 via the WCDMA stack 130, the modem 132 generates an IP packet indicating that the relevant IP packet is unallowable and transmits the IP packet to the mobile network 140 via the WCDMA stack 130. The modem 132 immediately generates a Radio Resource Control (RRC) connection release indicate message indicating a release of an RRC connection and transmits the RRC connection release indicate message to the mobile network 140 via the WCDMA stack 130. Although not shown, the mobile network 140 includes a base station, a base station controller, router, and other elements. The functions disclosed as performed by the mobile network 140 may be performed by any one or a combination of the devices in the mobile network 140. When receiving an IP packet directed to the mobile communication terminal 100 from an external server 150, the mobile network 140 transfers the relevant IP packet to the terminal 100.

The driver 134 records an IP packet received from the modem 132 on a DPRAM 120, and reads the DPRAM 120 to provide a packet corresponding to the read result to the modem 132. The DPRAM 120 is a memory shared by the application CPU 110 and the modem 132 and may record/write in two directions. The driver 116 reads the DPRAM 120 to provide an IP packet corresponding to the read result to the TCP/IP stack 114, and records a packet provided from the TCP/IP stack 114 on the DPRAM 120.

The TCP/IP stack 114 provides an IP packet provided from the driver 116 to the socket 112, and provides a packet provided from the socket 112 to the driver 116.

The socket 112 serves as an interface for a TCP/IP layer, manages a TCP/IP destination/source port number or a TCP/IP destination/source address determined in advance, provides an IP packet having a relevant port number or address among IP packets provided from the TCP/IP stack 114 to the application CPU 110, and provides a packet received from the application CPU 110 to the TCP/IP stack 114. According to an exemplary embodiment of the present invention, the socket 112 may provide a white/black list, which is an allowable/unallowable list of a TCP/User Datagram Protocol (UDP) port number to the TCP/IP stack 114, in order to provide the list to the modem 132. The modem 132 may store and manage the white/black list of the TCP/UDP port number and refer to the white/black list in filtering IP packets. The application CPU 110 processes an IP packet provided from the socket 112.

Figure 2:
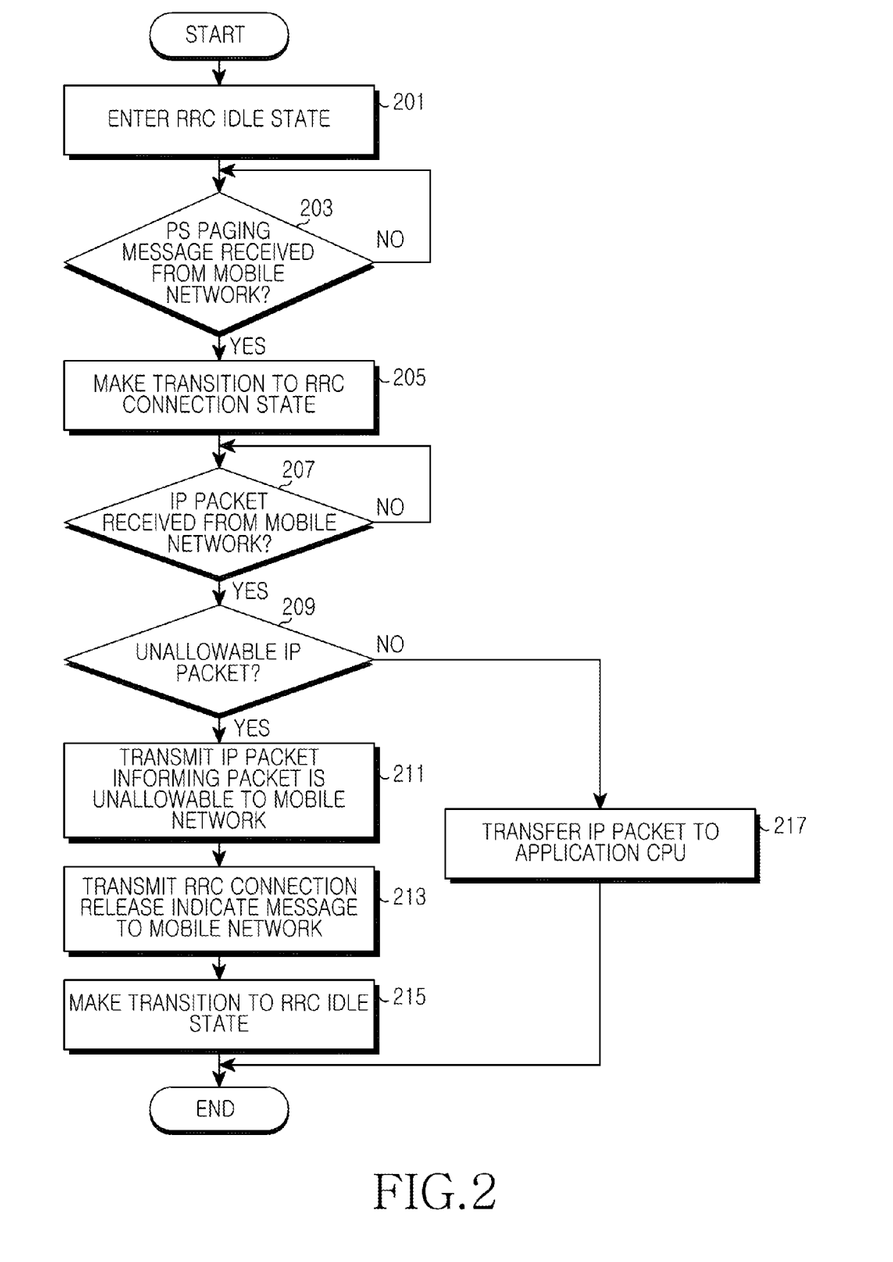
FIG. 2 is a flowchart illustrating a method for filtering an Internet Protocol (IP) packet received from a mobile network in a modem of a mobile communication terminal according to an exemplary embodiment of the present invention.

FIG. 2 is a flowchart illustrating a method for filtering an IP packet received from a mobile network in a modem of a mobile communication terminal according to an exemplary embodiment of the present invention.

Referring to FIG. 2, the modem of the terminal generates a Packet Data Protocol (PDP) context together with the mobile network and then enters an RRC idle state in step 201.

The modem determines whether a Packet Switched (PS) paging message is received from the mobile network in step 203. The PS paging message denotes a message indicating that an IP packet is scheduled to be transmitted and instructing to set an RRC connection.

When the modem detects a PS paging message in step 203, the modem sets an RRC connection to transition to an RRC connection state together with the mobile network in step 205.

The modem determines whether an IP packet is received from the mobile network in step 207. When the modem detects an IP packet in step 207, the modem determines whether the received IP packet is an unallowable IP packet in step 209. For example, when the modem receives an IP packet (TCP sync request packet) requesting an undesired TCP connection or a UDP packet having an unallowable port number from an external server via the mobile network, the modem may determine that the relevant IP packet is an unallowable IP packet.

When the modem determines that the received IP packet is an allowable IP packet in step 209, the modem transfers the received IP packet to the application CPU in step 217, and ends the algorithm.

When the modem determines that the received IP packet is an unallowable IP packet in step 209, the modem generates an IP packet indicating that the received IP packet is unallowable and transmits the IP packet to the mobile network in step 211. For example, where the received IP packet is an IP packet (TCP sync request packet) requesting an undesired TCP connection, the modem may generate an IP packet (TCP reset packet) ending a TCP connection and transmit the TCP reset packet to the mobile network. Alternatively, where the received IP packet is a UDP packet having an unallowable port number, the modem may generate an Internet Control Message Protocol (ICMP) packet (ICMP destination unreachable packet) indicating that the relevant port is not used and transmit the ICMP packet to the mobile network.

The modem generates an RRC connection release indicate message (signaling connection release indication message) indicating an RRC connection release and transmits the RRC connection release indicate message to the mobile network in step 213. The modem transitions to an RRC idle state together with the mobile network by releasing the RRC connection in step 215.

Figure 3:
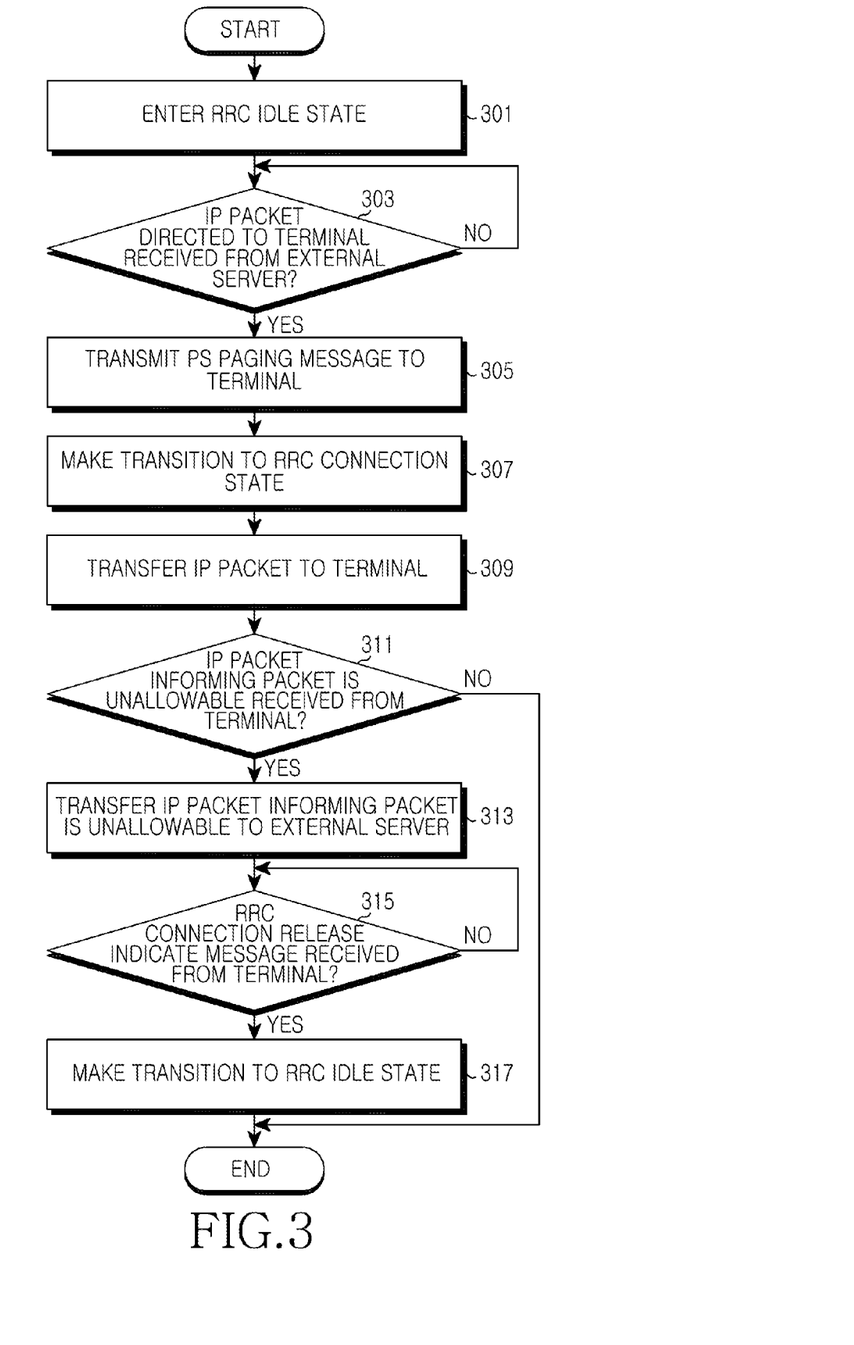
FIG. 3 is a flowchart illustrating a method for transmitting an IP packet to a terminal in a mobile network according to an exemplary embodiment of the present invention.

FIG. 3 is a flowchart illustrating a method for transmitting an IP packet to a terminal in a mobile network according to an exemplary embodiment of the present invention.

Referring to FIG. 3, the mobile network generates a PDP context together with the terminal and enters an RRC idle state in step 301.

The mobile network determines whether an IP packet directed to the terminal is received from an external server in step 303.

When the mobile network detects an IP packet directed to the terminal in step 303, the mobile network generates a PS paging message and transmits the PS paging message to the terminal in step 305. The PS paging message denotes a message indicating that an IP packet is scheduled to be transmitted and instructing to set an RRC connection.

The mobile network sets an RRC connection to make a transition to an RRC connection state together with the terminal in step 307, and transfers the IP packet received from the external server to the terminal in step 309.

The mobile network determines whether an IP packet informing that the transferred IP packet is unallowable is received from the terminal in step 311. For example, the mobile network may receive an IP packet (TCP reset packet) ending a TCP connection or an ICMP packet (ICMP destination unreachable packet) indicating that a relevant port is not used in response to the IP packet transferred to the terminal.

When the mobile network does not detect the IP packet indicating that the transferred IP packet is unallowable in step 311, the mobile network ends the algorithm.

When the mobile network detects the IP packet indicating that the transferred IP packet is unallowable in step 311, the mobile network transfers the IP packet informing that the packet is unallowable to the external server in step 313.

The mobile network determines whether an RRC connection release indicate message (signaling connection release indication message) instructing to release an RRC connection is received from the terminal in step 315. When the mobile network detects the RRC connection release indicate message in step 315, the mobile network releases the RRC connection to transition to an RRC idle state together with the terminal in step 317.

Figure 4:
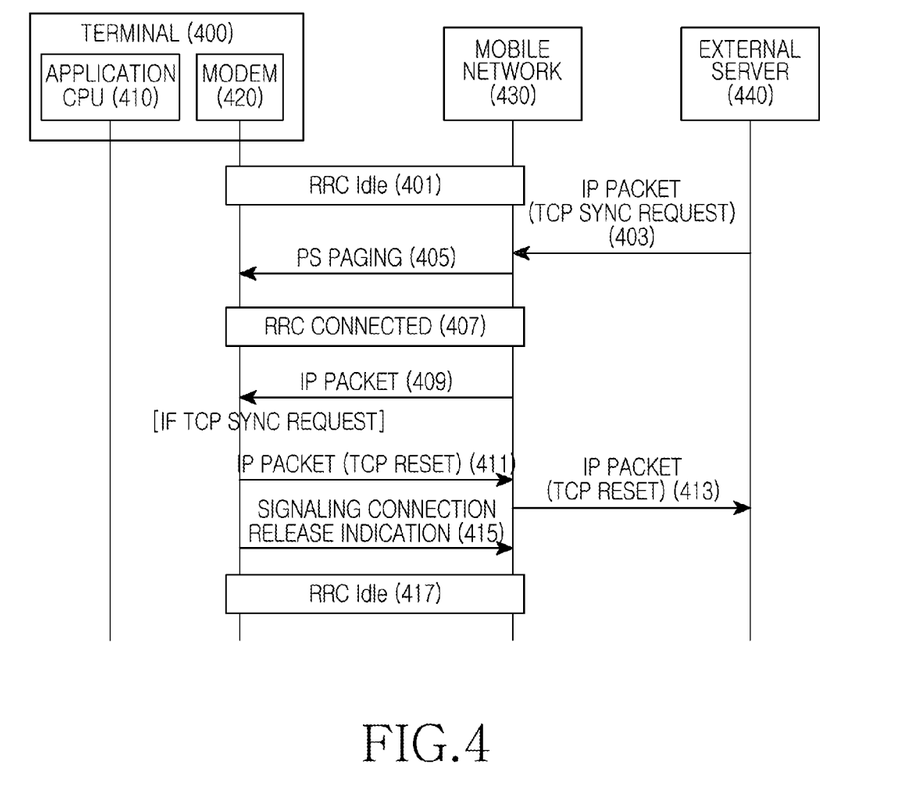
FIG. 4 is a view of a signal flow illustrating a method for filtering an IP packet in a mobile communication terminal according to an exemplary embodiment of the present invention.

FIG. 4 is a view of a signal flow illustrating a method for filtering an IP packet in a mobile communication terminal according to an exemplary embodiment of the present invention.

Referring to FIG. 4, a modem 420 of a terminal 400 and a mobile network 430 generate a PDP context and enter an RRC idle state in step 401.

An external server 440 generates an IP packet (TCP sync request packet) requesting the terminal 400 to make a TCP connection and transmits the IP packet to the mobile network 430 in step 403.

When the mobile network 430 receives an IP packet directed to the terminal 400 from the external server, the mobile network 430 generates a PS paging message and transmits the PS paging message to the terminal 400 in step 405, sets an RRC connection to transition to an RRC connection state together with the terminal 400 in step 407, and transfers the IP packet received from the external server 440 to the modem 420 of the terminal 400 in step 409.

When the modem 420 receives an IP packet from the mobile network 430, the modem 420 of the terminal 400 determines whether the received IP packet is an IP packet (TCP sync request packet) requesting an undesired TCP connection. When the modem 420 determines that the received IP packet is an IP packet requesting an undesired TCP connection, the modem 420 generates an IP packet (TCP reset packet) ending a TCP connection and transmits the IP packet to the mobile network 430 in step 411. Although not shown, when the modem 420 determines that the received IP packet is not an IP packet requesting an undesired TCP connection, the modem 420 of the terminal 400 transmits the received IP packet to the application CPU 410 of the terminal 400.

When the mobile network 430 receives an IP packet (that is, a TCP reset packet) corresponding to an IP packet (that is, a TCP sync request packet) transferred in advance from the modem 420 of the terminal 400, the mobile network 430 transfers the received IP packet (that is, the TCP reset packet) to the external server 440 in step 413.

The modem 420 that has transmitted the IP packet (TCP reset packet) ending the TCP connection to the mobile network 430 generates an RRC connection release indicate message (signaling connection release indication message) instructing to release an RRC connection and transmits the RRC connection release indicate message to the mobile network 430 in step 415, and releases the RRC connection to transition to an RRC idle state together with the mobile network 430 in step 417.

The modem 420 may determine whether the received IP packet is an IP packet (TCP sync request packet) requesting a TCP connection by decoding a TCP header of the IP packet received from the mobile network 430. In the case where a TCP header of an IP packet includes a 1-bit Synchronization (SYN) flag requesting a TCP connection, for example, the SYN flag is set to '1', the modem 420 of the terminal 400 may determine that the received IP packet is an IP packet (TCP sync request packet) requesting a TCP connection.

In addition, where the TCP header of an IP packet includes a 1-bit Reset (RST) flag ending a TCP connection, the modem 420 of the terminal 400 may set the RST flag to '1' to generate an IP packet (TCP reset packet) ending a TCP connection.

Figure 5:
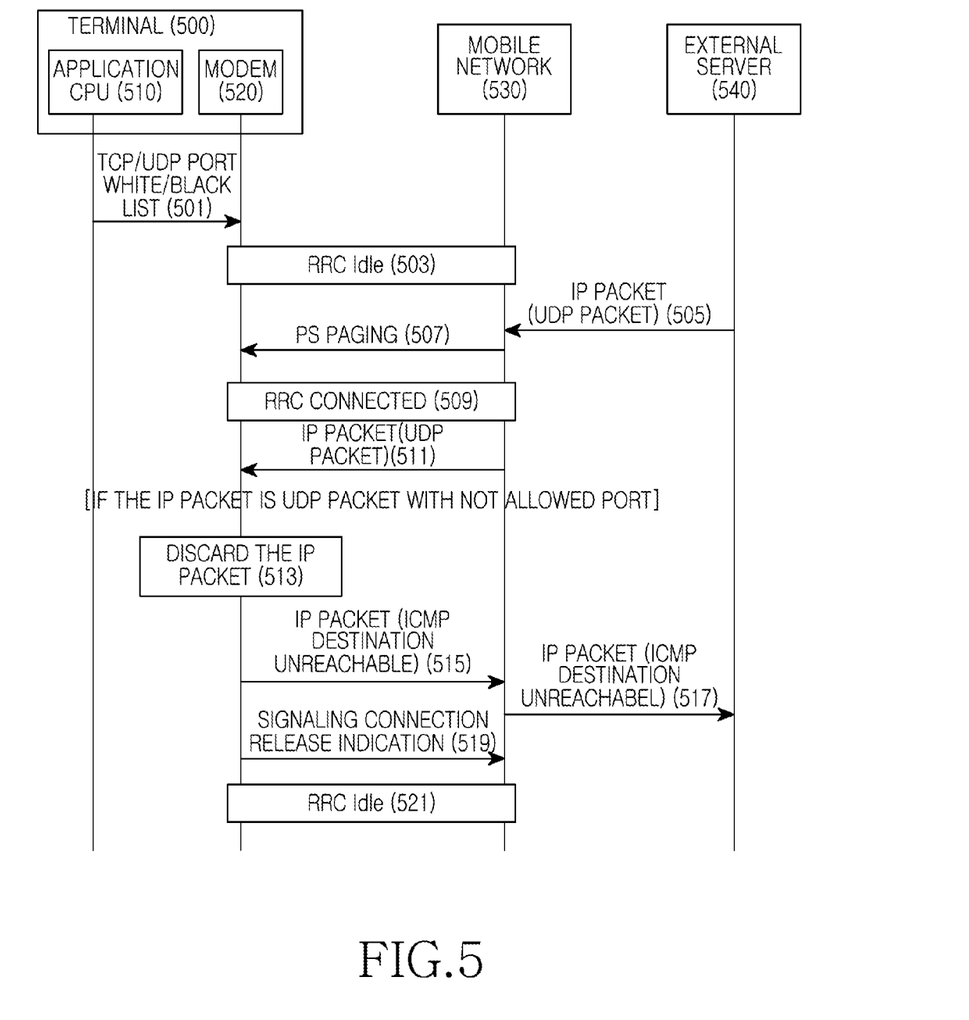
FIG. 5 is a view of a signal flow illustrating a method for filtering an IP packet in a mobile communication terminal according to an exemplary embodiment of the present invention.

FIG. 5 is a view of a signal flow illustrating a method for filtering an IP packet in a mobile communication terminal according to an exemplary embodiment of the present invention.

Referring to FIG. 5, during data connection or when a terminal boots, an application CPU 510 of the terminal 500 provides a white/black list, that is, an allowable/unallowable list of a TCP/UDP port number to a modem 520 of the terminal 500. The modem 520 of the terminal 500 stores and manages the white/black list of the TCP/UDP port number in step 501. A Voice over IP (VoIP) that uses a Session Initiation Protocol (SIP), a video telephony, instant messaging, etc. transfers call setup signaling or message via a UDP port. An IP packet having a TCP/UDP port number reserved in advance should be transferred to the application CPU. For this purpose, the application CPU 510 provides a white/black list of a TCP/UDP port number to the modem 520 for use when filtering an IP packet.

A white/black list of a TCP/UDP port number that the application CPU 510 provides to the modem 520 may have a structure as illustrated in Table 1 below.

TABLE 1

| Protocol | White/Black | Source Port | Destination Port |
|---|---|---|---|
| 0 = UDP<br>1 = TCP | 0 = White<br>1 = Black | Integer | Integer |

After generating a PDP context, the modem 520 of the terminal 500 and the mobile network 530 enter an RRC idle state in step 503.

An external server 540 generates a UDP packet to be transmitted to the terminal 500 and transmits an IP packet to the mobile network 530 in step 505.

When the mobile network 530 receives an IP packet directed to the terminal 500 from the external server 540, the mobile network 530 generates a PS paging message and transmits the PS paging message to the terminal 500 in step 507, sets an RRC connection to transition to an RRC connection state together with the terminal 500 in step 509, and transfers the IP packet received from the external server 540 to the modem 520 of the terminal 500 in step 511.

When the modem 520 receives the IP packet from the mobile network 530, the modem 520 determines whether the received IP packet is a TCP/UDP packet having a port number unallowable by the application CPU 510 based on the white/black list of the TCP/UDP port number. When the modem 520 determines that the received IP packet is a TCP/UDP packet having the port number unallowable by the application CPU 510, the modem 520 deletes the received IP packet in step 513, and generates an ICMP packet (ICMP destination unreachable packet) indicating that a relevant port is not used and transmits an IP packet to the mobile network 530 in step 515. Although not shown, when the modem 520 determines that the received IP packet is a TCP/UDP packet having the port number allowable by the application CPU 510, the modem 520 transmits the received IP packet to the application CPU 510.

When the mobile network 530 receives an IP packet (that is, ICMP destination unreachable packet) corresponding to the IP packet (that is, UDP packet) transferred in advance from the modem 520, the mobile network 530 transmits the received IP packet (that is, ICMP destination unreachable packet) to the external server 540 in step 517.

The modem 520 generates an RRC connection release indicate message (signaling connection release indication message) instructing to release an RRC connection and transmits the RRC connection release indicate message to the mobile network 530 in step 519, and releases an RRC connection to transition to an RRC idle state together with the mobile network 530 in step 521.

As described above, the modem 520 of the terminal 500 manages an unallowable/allowable TCP/UDP port number using the white/black list, monitors a received IP packet to block an IP packet having a port number that exists on the black list or does not exist on the white list, and transfers an IP packet having a port number that exists on the white list or does not exist on the black list to the application CPU 510.

Since there is a high possibility that packet communication is in progress while a user operates a terminal via a user interface, the IP packet filtering of the modem 520 according to exemplary embodiments of the present invention may be applicable to only the case where the application CPU 510 is in a sleep state.

As described above, in the case where an undesired IP packet is introduced from an external server in an always-on mobile communication terminal including two CPUs, a modem of a terminal filters the relevant IP packet, and immediately instructs a mobile network to release an RRC connection, thereby reducing unnecessary current consumption.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method comprising:
receiving, at an electronic device including a first processor and a second processor, using the first processor, a connection request via a network; and
refraining from transmitting the connection request from the first processor to the second processor based at least in part on a determination that the second processor is in a sleep state, and that the connection request is associated with data set as unallowable by the second processor.

2. The method of claim 1, wherein the connection request is transmitted to the network from another electronic device external to the electronic device.

3. The method of claim 1, wherein the refraining comprises:
determining that the connection request is associated with the data set as unallowable based at least in part on a port number or an internet protocol address to which the data is directed.

4. The method of claim 1, wherein the refraining comprises:
discarding, using the first processor, the connection request.

5. The method of claim 1, further comprising:
transmitting at least part of the connection request from the first processor to the second processor based at least in part on a determination that the connection request is not associated with the data.

6. The method of claim 1, further comprising:
receiving, using the first processor, other data indicative of the connection request via the network prior to the receiving of the connection request; and
transitioning, using the first processor, a radio resource control state from a first state to a second state based at least in part on the receiving of the other data.

7. The method of claim 1, wherein the connection request comprises at least one of a transmission control protocol packet, a user datagram protocol packet, or an internet protocol packet.

8. The method of claim 1, further comprising:
transmitting, using the first processor, other data indicative of a release of the connection request via the network to another electronic device external to the electronic device.

9. The method of claim 1, further comprising:
transmitting, using the first processor, other data indicative of a release of a radio channel to the network.

10. An apparatus comprising:
a first processor to execute an application; and
a second processor to control a communicative connection between the apparatus and a network, the second processor configured to:
receive a connection request via the network; and
refrain from transmitting the connection request to the first processor based at least in part on a determination that the connection request is associated with data set as unallowable by the first processor.

11. The apparatus of claim 10, wherein the second processor is configured to:
perform the refraining further based on a determination that the first processor is in a sleep state.

12. The apparatus of claim 10, wherein the second processor is configured to:
transmit at least part of the connection request to the first processor based at least in part on a determination that the connection request is not associated with the data.

13. The apparatus of claim 10, wherein the second processor is configured to:
receive other data indicative of the connection request via the network prior to the receiving of the connection request; and
transition a radio resource control state associated with the apparatus from a first state to a second state based at least in part on the receiving of the other data.

14. The apparatus of claim 10, wherein the connection request comprises at least one of a voice over internet protocol, a video telephony, instant messaging, and a push mail.

15. The apparatus of claim 10, wherein the second processor is configured to:
transmit other data indicative of a release of the connection request via the network to an electronic device external to the apparatus.

16. The apparatus of claim 10, wherein the second processor is configured to:
transmit other data indicative of a release of a radio channel to the network.

17. The apparatus of claim 10, wherein the second processor is configured to:
determine that the connection request is associated with the data set as unallowable based at least in part on a port number or an internet protocol address to which the data is directed.

18. The apparatus of claim 10, wherein the second processor is configured to:
discard the connection request as at least part of the refraining.

19. The apparatus of claim 10, wherein the connection request is transmitted to the mobile network from another electronic device external to the electronic device.

20. A non-transitory machine-readable storage device storing instructions that, when executed by one or more processors, cause the one or more processors to perform operations comprising:
receiving, at an electronic device including a first processor and a second processor, using the first processor, a connection request via a network; and
refraining from transmitting the connection request from the first processor to the second processor based at least in part on a determination that the second processor is in a sleep state, and that the connection request is associated with data set as unallowable by the second processor.

* * * * *